(12) United States Patent
Nomura

(10) Patent No.: US 7,935,919 B2
(45) Date of Patent: May 3, 2011

(54) BURST LIGHT RECEIVING POWER MONITOR CIRCUIT, METHOD, AND PROGRAM

(75) Inventor: Rintaro Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 80 days.

(21) Appl. No.: 12/369,088

(22) Filed: Feb. 11, 2009

(65) Prior Publication Data

US 2009/0200450 A1    Aug. 13, 2009

(30) Foreign Application Priority Data

Feb. 12, 2008  (JP) ................................. 2008-031177

(51) Int. Cl.
*G01J 1/44*  (2006.01)
(52) U.S. Cl. ................ 250/214.1; 250/214 DC; 398/15; 398/38
(58) Field of Classification Search ............... 250/214.1, 250/214 DC; 398/15, 38
See application file for complete search history.

(56) References Cited

U.S. PATENT DOCUMENTS 5,528,409 A * 6/1996 Cucci et al. ..................... 398/15
2008/0002973 A1 * 1/2008 Yamabana et al. .............. 398/38

FOREIGN PATENT DOCUMENTS

JP        1998243041 A    9/1998
JP        2002057627 A    2/2002

* cited by examiner

*Primary Examiner* — Seung C Sohn

(57) ABSTRACT

The present invention allows immediate reading of a monitor voltage of a required arbitrary burst cell and provides a burst light receiving power monitor circuit that monitors the monitor voltage of a burst cell, the burst light receiving power monitor circuit comprising: a memory that includes a plurality of areas and that prepares an address for each area; a monitor voltage forming section that converts input signal light of the burst cell to a digital monitor voltage amplitude; and a controller that continuously stores the monitor voltage amplitude from the monitor voltage forming section in each area of the memory specified with an address by a control signal externally inputted according to the timing of the burst cell and that controls reading out a monitor voltage from an arbitrary area of the memory specified with an address by an external memory access signal.

7 Claims, 11 Drawing Sheets

100: OPTICAL MODULE
101: PHOTODIODE

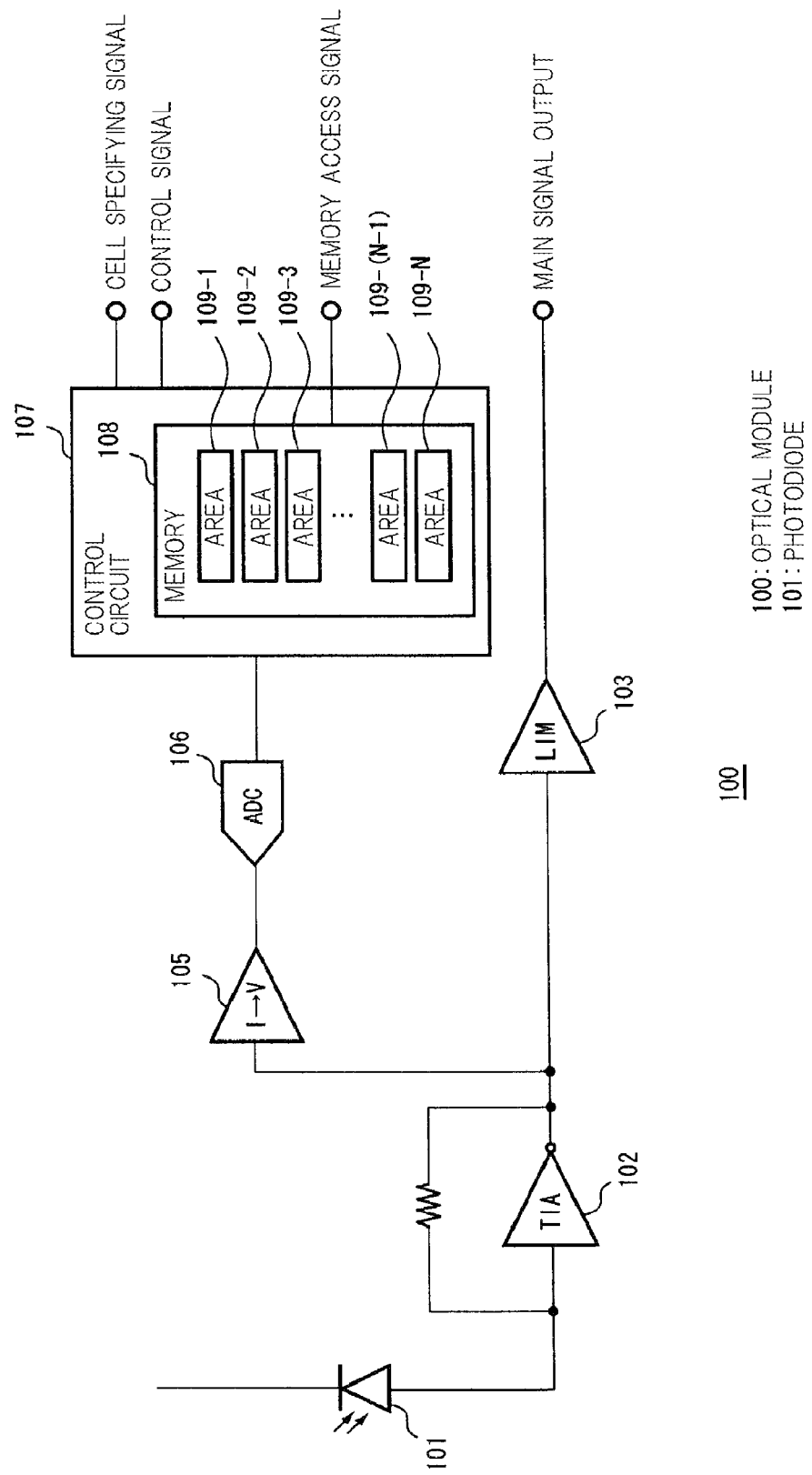

BURST LIGHT RECEIVING POWER MONITOR CIRCUIT, METHOD, AND PROGRAM

This application is based upon and claims the benefit of priority from Japanese patent application No. 2008-031177, filed on Feb. 12, 2008, the disclosure of which is incorporated herein in its entirety by reference.

BACKGROUND OF THE INVENTION

1. Field of the Invention

The present invention relates to a burst light receiving power monitor circuit that measures the light receiving power of burst cells. In particular, the present invention relates to a burst light receiving power monitor, method, and program capable of monitoring the light receiving power of all burst cells as needed.

2. Description of the Related Art

FIG. 1 is a block diagram of a schematic configuration of an optical module as a basis of the present invention. In the present description and the drawings, the same constituent elements are designated with the same reference numerals and symbols throughout the drawings. As shown in FIG. 1, optical module 100 comprises PD (photodiode) 101, TIA (transimpedance amplifier) 102, LIM (limiting amplifier) 103, current mirror circuit 104, current/voltage converter circuit 105, ADC (analog/digital converter) 106, and control circuit 107 and includes a reception function.

PD 101 converts received light to an electric current.

TIA 102 is connected to the anode side of PD 101 and is a transimpedance amplifier which correspond to burst signal, and converts a current signal to a voltage signal. TIA 102 modulates the light received in PD 101 to an electrical signal.

LIM 103 is connected to TIA 102 and amplifies an input signal level, which varies according to the reception state, to an output signal of a certain level to form a main output signal.

Current mirror circuit 104 is connected to the cathode side of PD 101 and is a constant current source circuit. Current mirror circuit 104 outputs the same current as input current.

Current/voltage converter circuit 105 is connected to current mirror circuit 104 and converts an input current to a voltage before outputting.

ADC 106 is connected to current/voltage converter circuit 105 and converts an inputted voltage from analog to digital.

Control circuit 107 is connected to ADC 106, imports a digital voltage signal from current/voltage converter circuit 105, and imports a control signal as a trigger from outside according to the timing of a burst cell.

Memory 108 is arranged in control circuit 107, and the digital voltage signal from current/voltage converter circuit 105 is imported and stored in area 109 of memory 108 in burst cells. The digital voltage signal stored in memory 108 is read out by an external memory access signal from a memory access input/output terminal and is used to monitor the light receiving power of burst cells.

FIG. 2 is an explanatory view of an operation example of monitoring the light receiving power of burst cells of optical module 100 in FIG. 1. As shown in FIG. 2(A), optical module 100 processes input signal light for burst cells 200-1, 200-2, 200-3, ..., and 200-N that are burst-transmitted. As shown in FIG. 2(B), control circuit 107 imports monitor voltage digital amplitudes P1, P2, P3, ..., and PN relative to the input signal light of burst cells 200-1, 200-2, 200-3, ..., and 200-N.

As shown in FIG. 2(C), a control signal is inputted to control circuit 107.

As shown in FIG. 2(D), monitor voltages p1, p2, p3, ..., PN are sequentially stored in area 109 of memory 108 with the control signal serving as a trigger.

FIG. 3 is a flow chart for explaining an example of a series of operations of control circuit 107 of optical module 100 in FIG. 1. As shown in FIG. 3, k=1 is set in control circuit 107 in step S301.

In step S302, control circuit 107 imports monitor voltage Pk.

In step S303, control circuit 107 stores inputted monitor voltage Pk in memory 108.

In step S304, control circuit 107 uses a memory access signal to check whether there is a request to read out monitor voltage Pk. If it cannot be confirmed, the process proceeds to step S306.

In step S305, if there is a request to read out monitor voltage Pk, control circuit 107 reads out monitor voltage Pk from memory 108.

In step S306, control circuit 107 deletes monitor voltage Pk that is stored in memory 108. The deletion is for the preparation of the next storage. Rather than being deleted, monitor voltage Pk may be stored immediately before the process of step S303, and the next monitor voltage Pk+1 may overwrite monitor voltage Pk in step S303.

In step S307, whether k=N is checked. If this cannot be confirmed, the process proceeds to step S309.

In step S308, k=k+1 is executed. The process then returns to step S302, and the above processes are repeated.

In step S309, the process proceeds to step S301 if there is no request for reception termination, and the above processes are repeated to allow monitoring of all burst light continuously received in the actual operation. If there is a request for reception termination, the process ends.

As described, there is only one area 109 in memory 108 for storing monitor voltages as light receiving power. Therefore, there is a problem in that only one part of burst cells can be monitored at once.

Thus, as shown in FIG. 2, only one monitor voltage can be read out for each control signal input.

This is because a procedure that executes a conversion process of ADC 106 by using a control signal, inputting to control signal to control circuit 107, storing it memory 108 and reading out a stored value from memory 108 is required to monitor the light receiving power of burst cells.

For example, all data of burst cells 200-1, 200-2, 200-3, ..., 200-N cannot be read out at once, and the procedure needs to be repeated for N times, thus the procedure cannot provide an immediate result. Furthermore, the monitor voltage of one required arbitrary burst cell cannot be read out immediately, thus the procedure cannot provide an immediate result.

There is also a problem that it is impossible to set the alarm for the monitor voltage of a burst cell that is not power-monitored.

Examples of techniques related to such an optical module include the following.

A technique described in Japanese Patent Laid-Open No. 2002-057627 provides a system and a method for improving transmission efficiency with a relatively simple configuration. In an optical communication system including substations connected to a master station through an optical coupler, the master station comprises: a light level detector that measures a reception level of an optical signal transmitted from each substation to the master station to generate measurement information; a storage unit that stores the measurement information for each substation generated in the light level detector in association with the substation; a controller that generates adjustment information to make an optical signal level constant at the maximum level based on the measurement information of substations read out from the storage unit; an optical amplifier that amplifies the optical signal level from the substations based on adjustment information from the controller; a light receiver that converts an output of the optical amplifier to an electrical signal; and a received data processor that receives the signal outputted from the light receiver as a received signal.

The technique described in Japanese Patent Laid-Open No. 2002-057627 makes the optical signal level constant at the maximum level based on the measurement information of the substations read out from the storage unit that stores the measurement information for each substation generated by the light level detector in association with the substation. However, the technique does not solve the problem in which the monitor voltage of a required arbitrary burst cell cannot be immediately read out, thus this technique cannot provide an immediate result.

A technique described in Japanese Patent Laid-Open No. 10-243041 can obtain a stable frame signal with a fast reaction to the input even if the input level is low, can prevent a reduction in transmission efficiency, and can prevent narrowing down of the dynamic range of the input level. In the technique described in Japanese Patent Laid-Open No. 10-243041, a logarithmic amplifier outputs a power level of a modulated wave input as a logarithmic value, and an integrator smoothes the logarithmic value and outputs RSSI. A comparator compares properly set reference value REF and RSSI and outputs a 'LO' frame signal if RSSI is lower, i.e. in a section with no signal. The comparator outputs a 'HI' frame signal if RSSI is higher, i.e. in a section with a signal. A timer circuit is fixed to 'HI' unless the comparator output is continuously 'LO' for more than one clock cycle. After the comparator output is fixed to "LO", if two clocks CLK are inputted, the timer circuit output becomes 'HI', and the timer output is fixed to 'HI' until the comparator output again becomes 'HI'.

In the technique described in Japanese Patent Laid-Open No. 10-243041, the comparator compares properly set reference value REF and RSSI, the reaction to an input is fast, a stable frame signal can be obtained even if the input level is low, transmission efficiency is not reduced, and the dynamic range of the input level is not narrowed down. However, the technique does not solve the problem that the monitor voltage of a required arbitrary burst cell cannot be immediately read out, thus this technique cannot provide an immediate result.

SUMMARY OF THE INVENTION

An object of the present invention is to provide a burst light receiving power monitor circuit, method, and program that can immediately read out a monitor voltage of a required arbitrary burst cell.

To solve the problems, the present invention provides a burst light receiving power monitor circuit that monitors a monitor voltage of a burst cell, the burst light receiving power monitor circuit comprising: a memory that includes a plurality of areas and that prepares an address for each area; a monitor voltage forming section that converts the input signal light of the burst cell to a digital monitor voltage amplitude; and a controller that continuously stores the monitor voltage amplitude from the monitor voltage forming section in each area of the memory specified with an address by a control signal externally inputted according to the timing of the burst cell and that controls reading out the monitor voltage from an arbitrary area of the memory specified with an address by an external memory access signal.

The control circuit stores a threshold, and when the monitor voltage amplitude stored in each of the plurality of areas of the memory exceeds the threshold, sets an alarm flag to the address of the area stores the monitor voltage amplitude so that an alarm determination will be executed.

The control circuit recognizes a burst cell when the burst cell is random according to an externally inputted cell specifying signal, specifies the address of the area, and stores the monitor voltage amplitude.

The monitor voltage forming section outputs a digital monitor voltage to the control with the input signal light of the burst cell being converted through a photodiode, a current mirror circuit, a current/voltage converter circuit and an ADC.

To a path that forms a main output signal by allowing the input signal light of the burst cell to pass through a photodiode, a TIA circuit, and a LIM circuit, the monitor voltage forming section outputs a digital monitor voltage to the control circuit with a current from the TIA circuit being converted by the current/voltage converter circuit and the ADC.

The present invention further provides a burst light receiving power monitor method for monitoring a monitor voltage of a burst cell, the burst light receiving power monitor method comprising: converting the input signal light of the burst cell to a digital monitor voltage amplitude; continuously storing the monitor voltage amplitude in each area of the memory specified with an address by a control signal externally inputted according to the timing of the burst cell; and controlling the read out of a monitor voltage from an arbitrary area of the memory specified with an address by an external memory access signal. The present invention further provides a burst light receiving power monitor program for monitoring the monitor voltage of a burst cell, the burst light receiving power monitor program comprising: converting the input signal light of the burst cell to a digital monitor voltage amplitude; continuously storing the monitor voltage amplitude in each area of the memory specified with an address by a control signal externally inputted according to the timing of the burst cell; and controlling the read out of a monitor voltage from an arbitrary area of the memory specified with an address by an external memory access signal.

BRIEF DESCRIPTION OF THE DRAWINGS

FIG. 11 is a second modified example of FIG. 4 and is a block diagram of a schematic configuration of the optical module according to the present invention.

EXEMPLARY EMBODIMENT

Exemplary embodiments will now be described with reference to the drawings.

Figure 1:
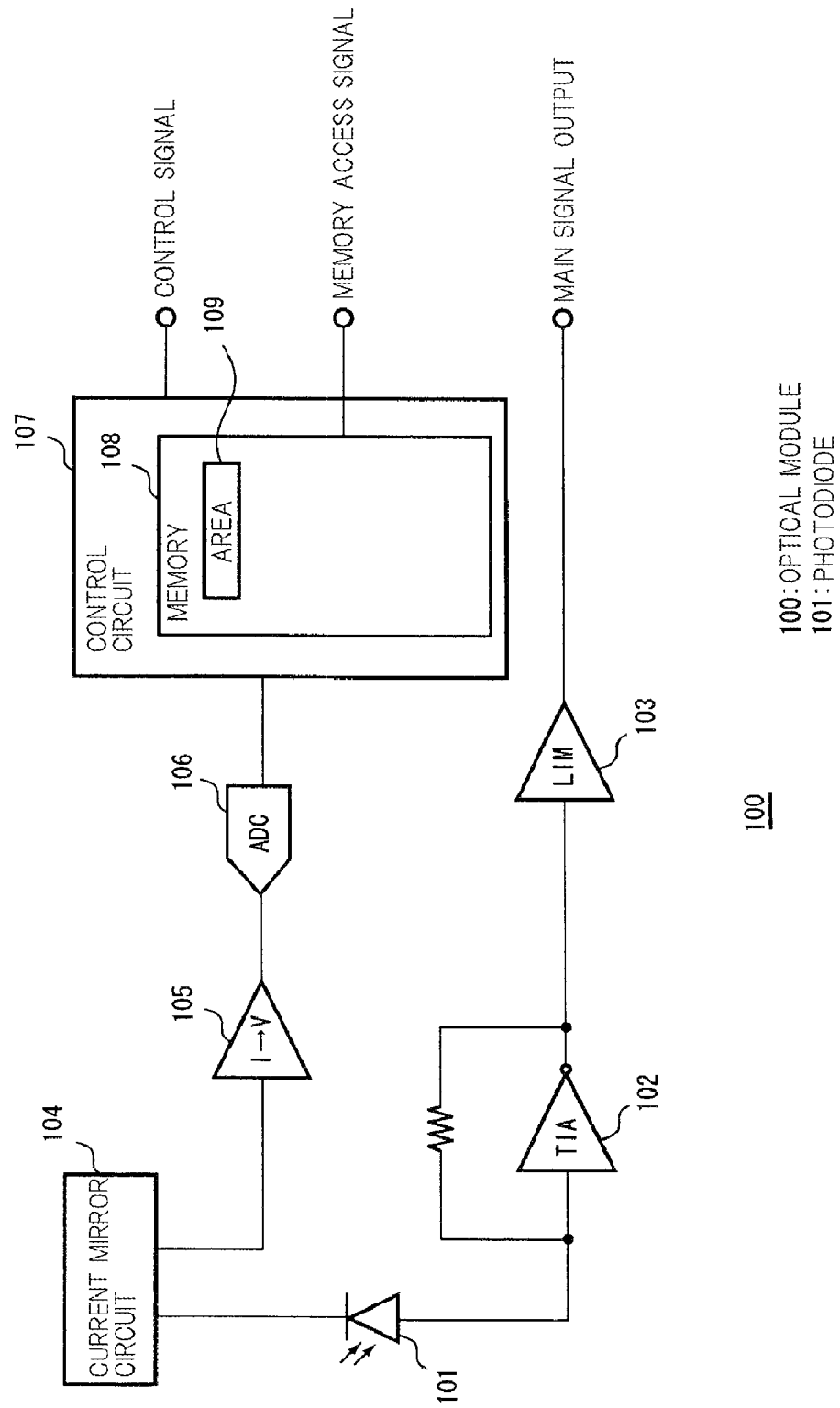
FIG. 1 is a block diagram of a schematic configuration of an optical module according to the present invention.
Figure 2:
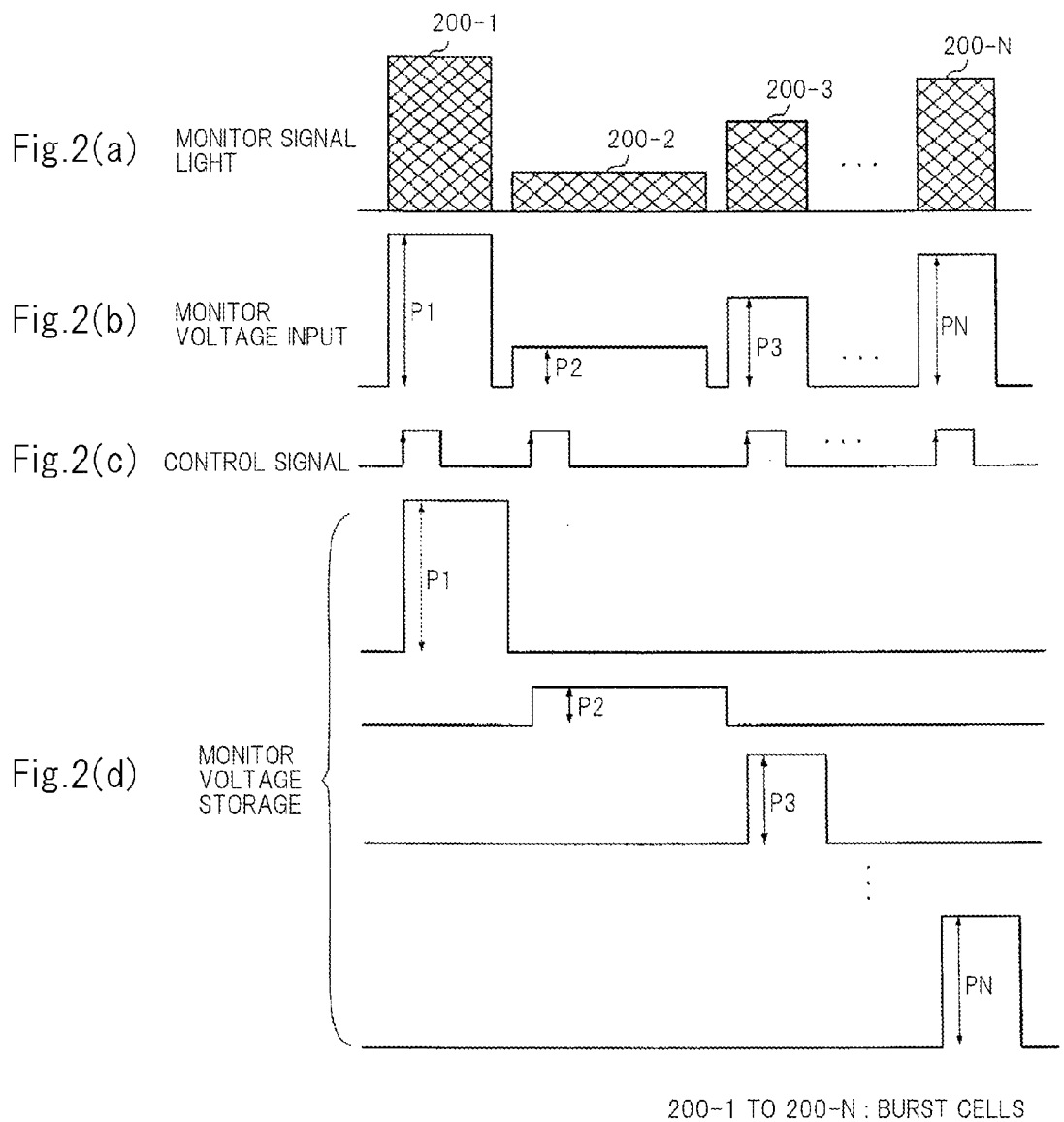
FIG. 2 is an explanatory view of an operation example of monitoring light receiving power of burst cells of optical module 100 in FIG. 1.
Figure 3:
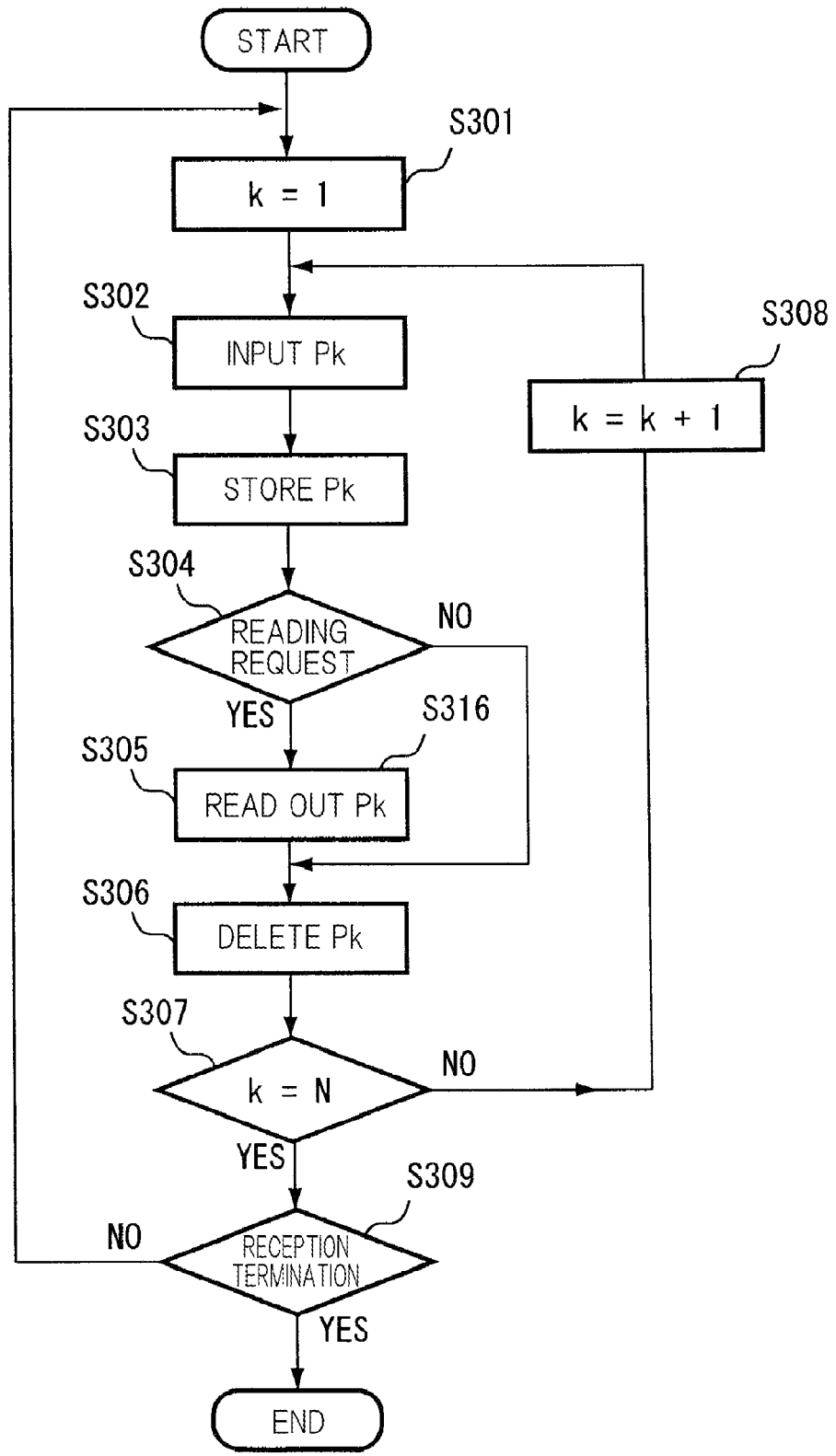
FIG. 3 is a flow chart for explaining an example of a series of operations of control circuit 107 of optical module 100 in FIG. 1.
Figure 4:
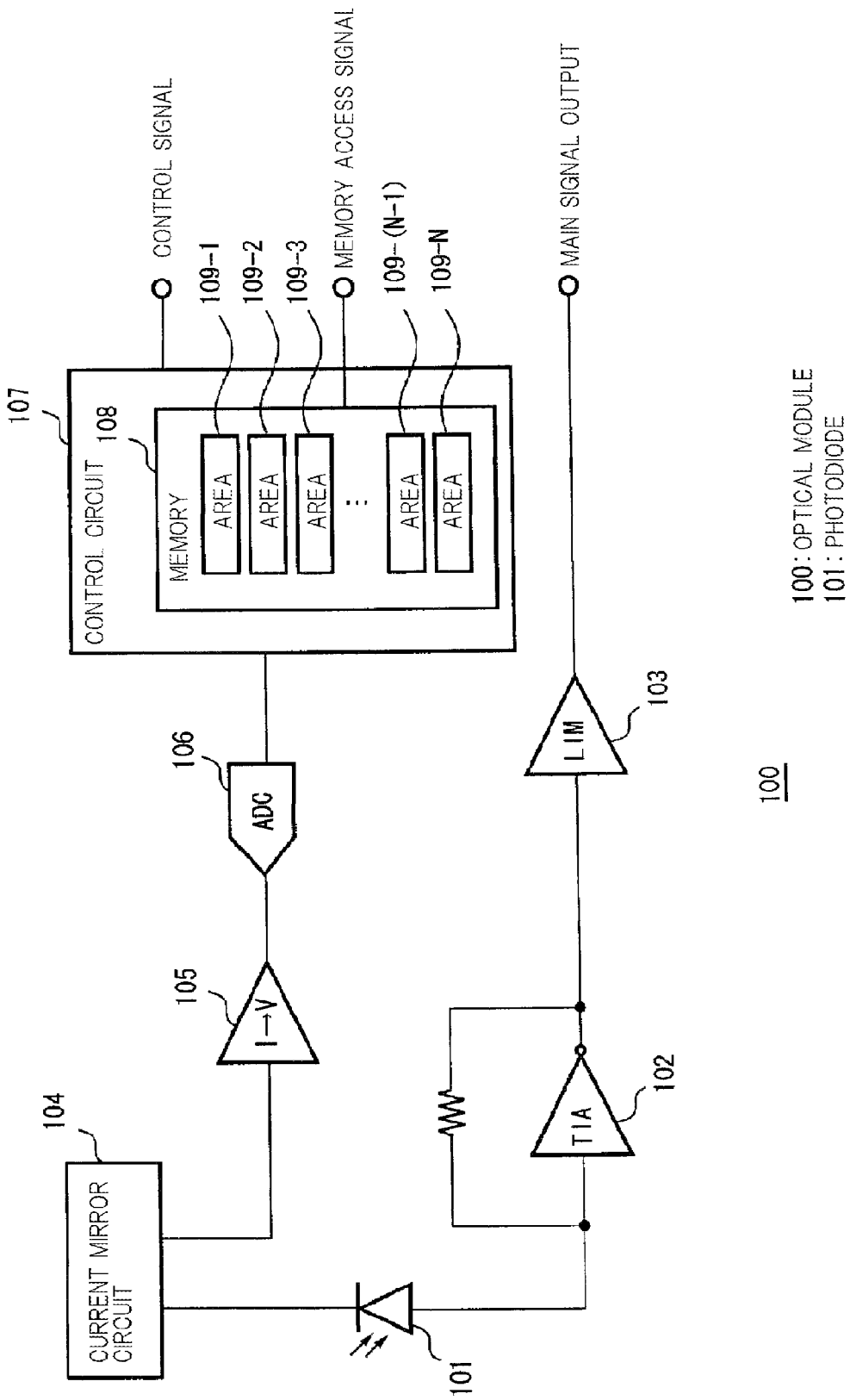
FIG. 4 is a block diagram of a schematic configuration of the optical module according to the present invention.

FIG. 4 is a block diagram of a schematic configuration of an optical module according to the present invention. Optical module 100 shown in FIG. 4 achieves burst light receiving power monitoring of differences of light receiving power of burst cells by using program control in a PON (Passive Optical Network) station device (OLT: Optical Line Termination) and that is an access optical communication system.

Figure 10:
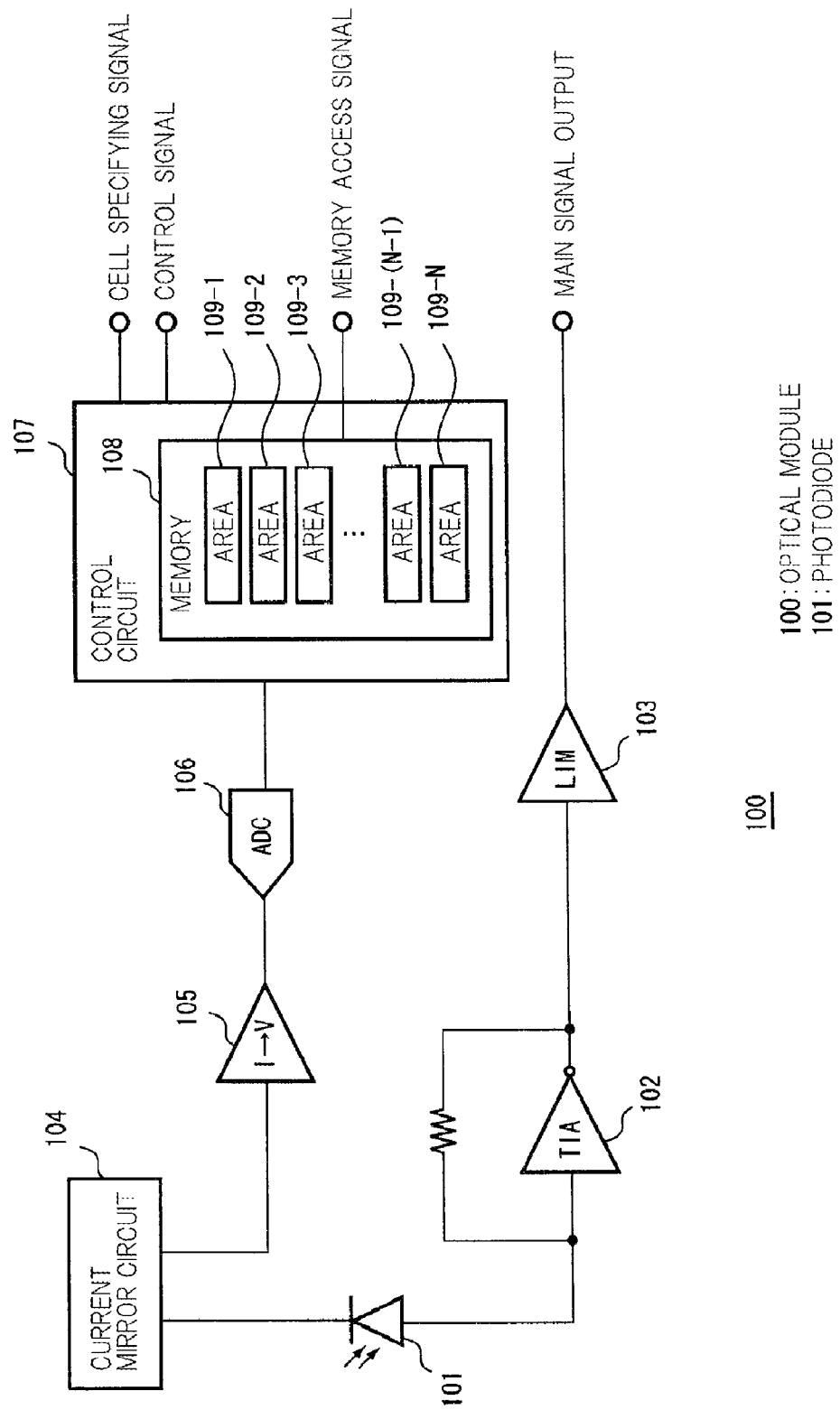
FIG. 10 is a first modified example of FIG. 4 and is a block diagram of a schematic configuration of the optical module according to the present invention.

As shown in FIG. 4, compared to FIG. 10, N areas 109-1, 109-2, 109-3, . . . , 109-(N−1), and 109-N are arranged in memory 108.

Figure 5:
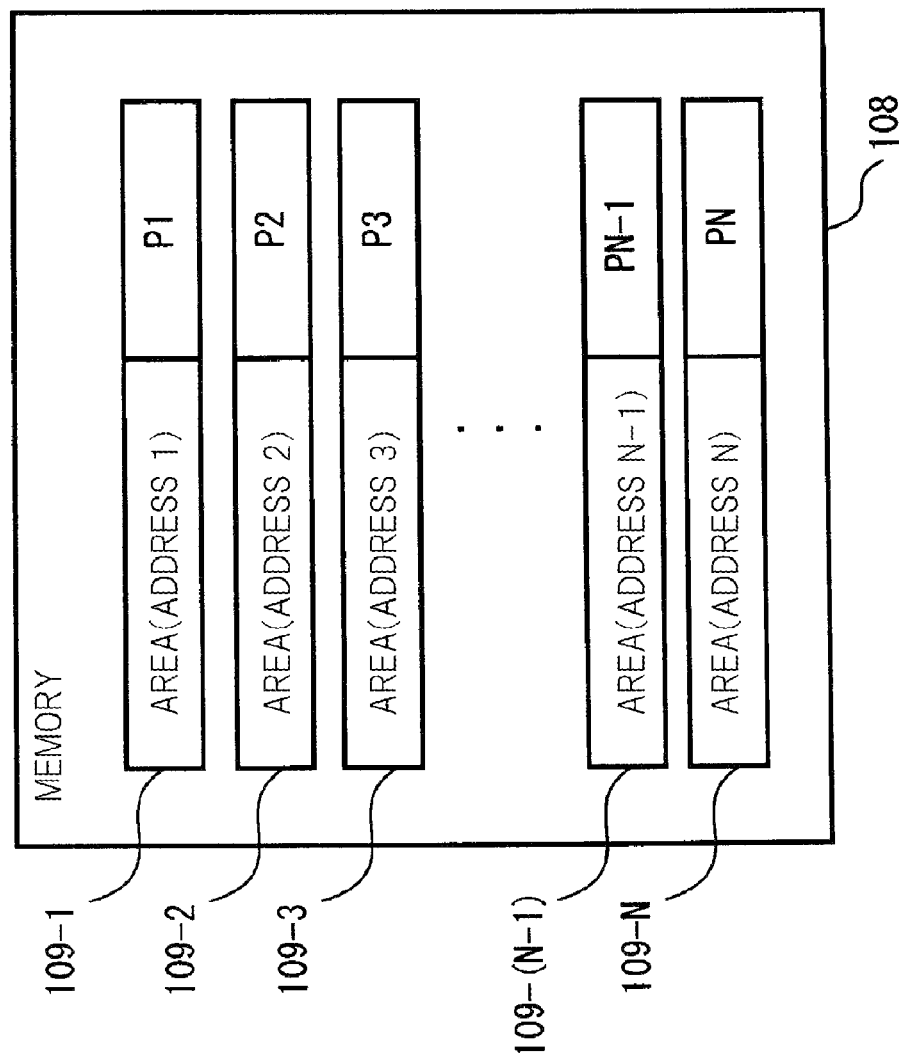
FIG. 5 is a block diagram for explaining control circuit 107 in FIG. 4.

FIG. 5 is a block diagram for explaining control circuit 107 in FIG. 4. As shown in FIG. 5, addresses 1, 2, 3, . . . , and (N−1) are respectively prepared in areas 109-1, 109-2, 109-3, . . . , 109-(N−1), and 109-N arranged in memory 108. Monitor voltage digital amplitudes P1, P2, P3, . . . , and PN of burst cells 200-1, 200-2, 200-3, . . . , and 200-N are respectively stored in areas 109-1, 109-2, 109-3, . . . , 109-N.

Figure 6:
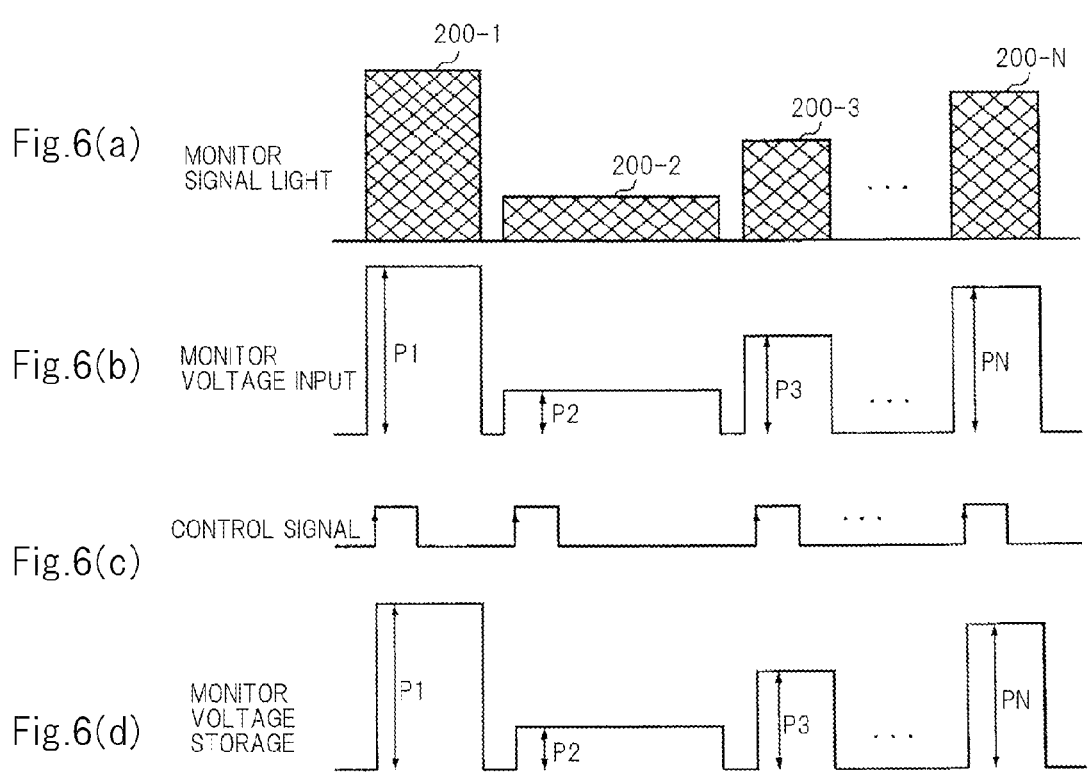
FIG. 6 is an explanatory view of an operation example of monitoring light receiving power of burst cells of optical module 100 in FIG. 4.

FIG. 6 is an explanatory view of an operation example of monitoring light receiving power of burst cells of optical module 100 in FIG. 4. As shown in FIGS. 6(C) and 6(D), compared to FIG. 11, monitor voltage digital amplitudes P1, P2, P3, . . . , and PN are respectively and continuously stored in areas 109-1, 109-2, 109-3, . . . , 109-(N−1), and 109-N of memory 108 based on external control signals, which serve as triggers, and that are associated with the timing of the burst cells.

Figure 7:
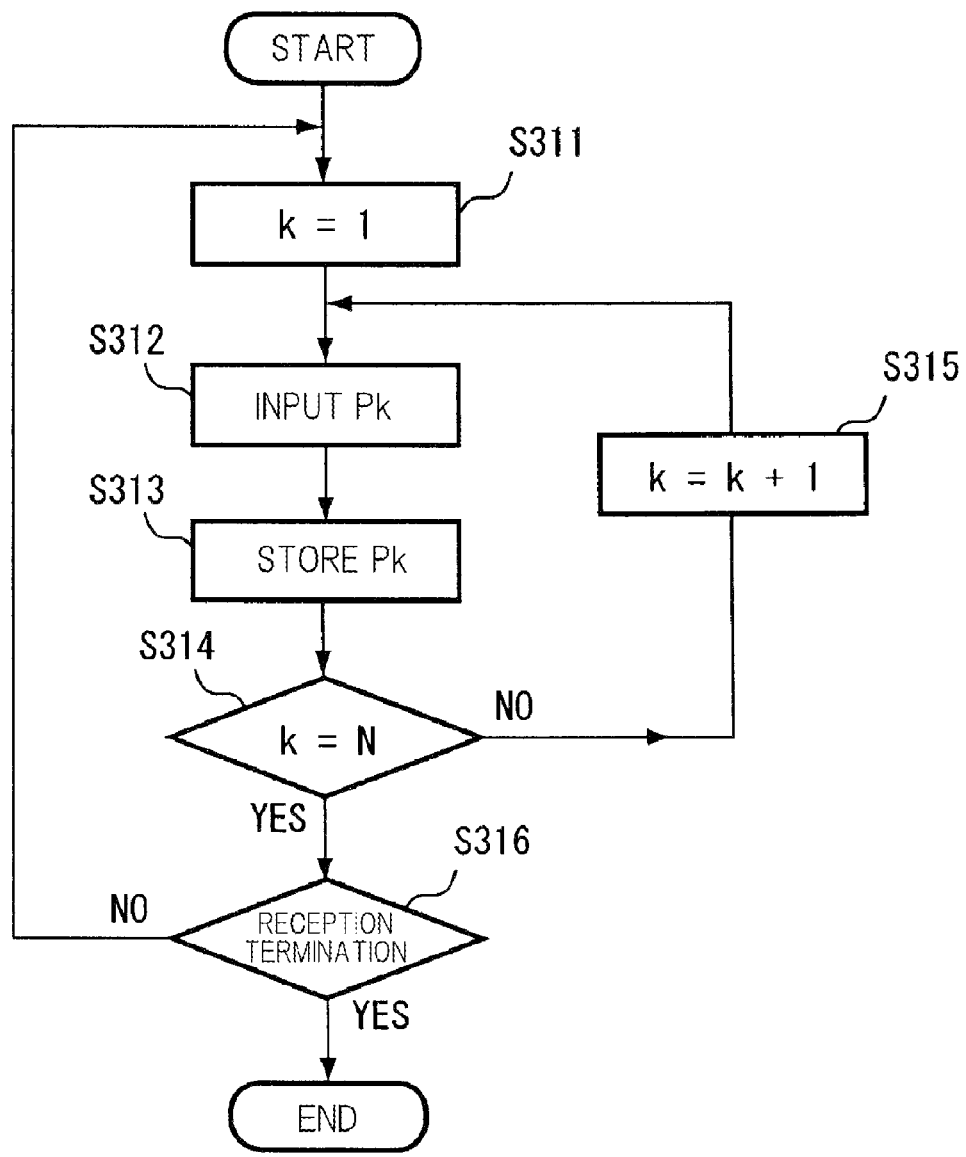
FIG. 7 is a flow chart for explaining an example of a series of storage operations of control circuit 107 of optical module 100 in FIG. 4.

FIG. 7 is a flow chart for explaining an example of a series of storage operations of control circuit 107 of optical module 100 in FIG. 4. As shown in FIG. 7, control circuit 107 sets k=1 in step S311.

In step S312, control circuit 107 imports monitor voltage Pk.

In step S313, control circuit 107 stores monitor voltage Pk inputted to area 109-*k* of memory 108 in which the address is specified. When old data is stored in area 109-*k*, new data overwrites the old data.

In step S314, whether k=N is checked. If this is confirmed, the process proceeds to step S316.

If this is not confirmed in step S314, k=k+1 is executed. The process then returns to step S312, and the above described processes are repeated.

In step S316, the process proceeds to step S311 if there is no request for reception termination, and the processes are repeated to allow monitoring of all burst light continuously received in the actual operation. If there is a request for reception termination, the process ends.

Figure 8:
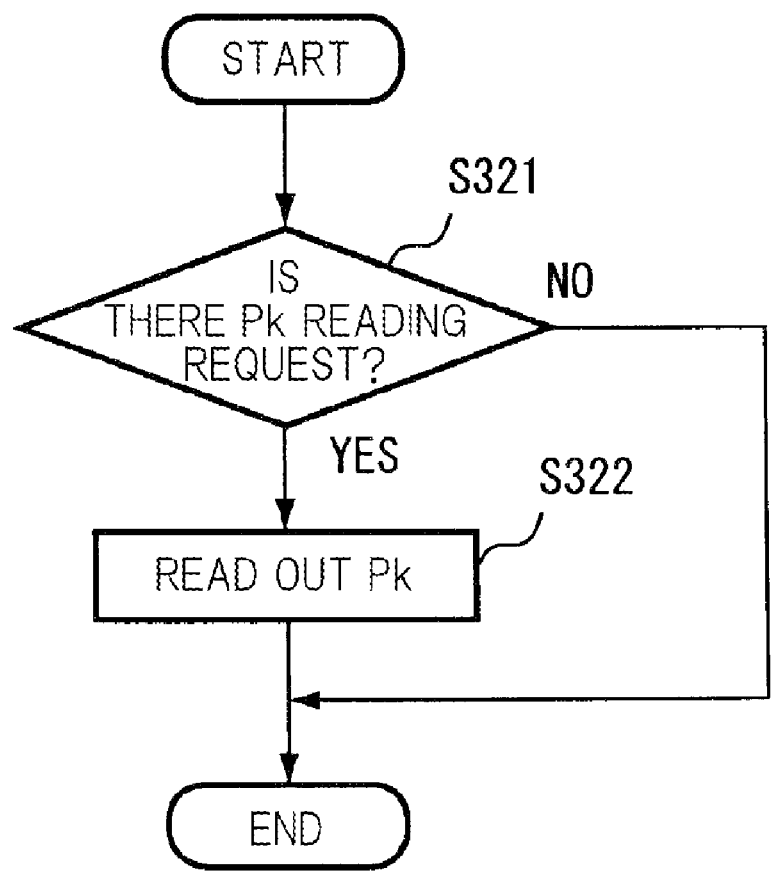
FIG. 8 is a flow chart for explaining an example of a series of reading operations of control circuit 107 of optical module 100 in FIG. 4.

FIG. 8 is a flow chart for explaining an example of a series of reading operations of control circuit 107 of optical module 100 in FIG. 4. As shown in FIG. 8, in step S321, control circuit 107 specifies an address that is to be checked to determine whether there is a request to read out monitor voltage Pk based on an external memory access signal from a memory access input/output terminal. If there is no request, the process ends.

In step S322, if there is a reading request, control circuit 107 reads out monitor voltage Pk from memory 108 and outputs monitor voltage Pk from memory access input/output terminal. In this case, one of the monitor voltage can be immediately read out from an arbitrary area of areas 109-1, 109-2, 109-3, . . . , 109-(N−1), and 109-N of memory 108. Furthermore, monitor voltages P1, P2, P3, . . . , and PN can be immediately read out at once. An arbitrary combination of the monitor voltages of areas 109-1, 109-2, 109-3, . . . , 109-(N−1), and 109-N of memory 108 can also be read out immediately. The process ends after the reading.

Therefore, according to the present invention, areas specified with addresses in a memory are provided to continuously import and store digital monitor voltage amplitudes of burst cells on a burst-cell-by-burst-cell basis based only on an external control signal. Furthermore, after the storage of continuous burst cells to the last area, the process returns to the storage of continuous burst cells to the first area to repeat the storage and thereby always store, in each area, the latest value of the digital monitor voltage amplitude corresponding to each burst cell. As a result, optical power of an arbitrary burst cell can be immediately read out and extracted at arbitrary timing by a memory access signal, and light receiving power of all burst cells can be monitored as needed.

First Exemplary Embodiment

Figure 9:
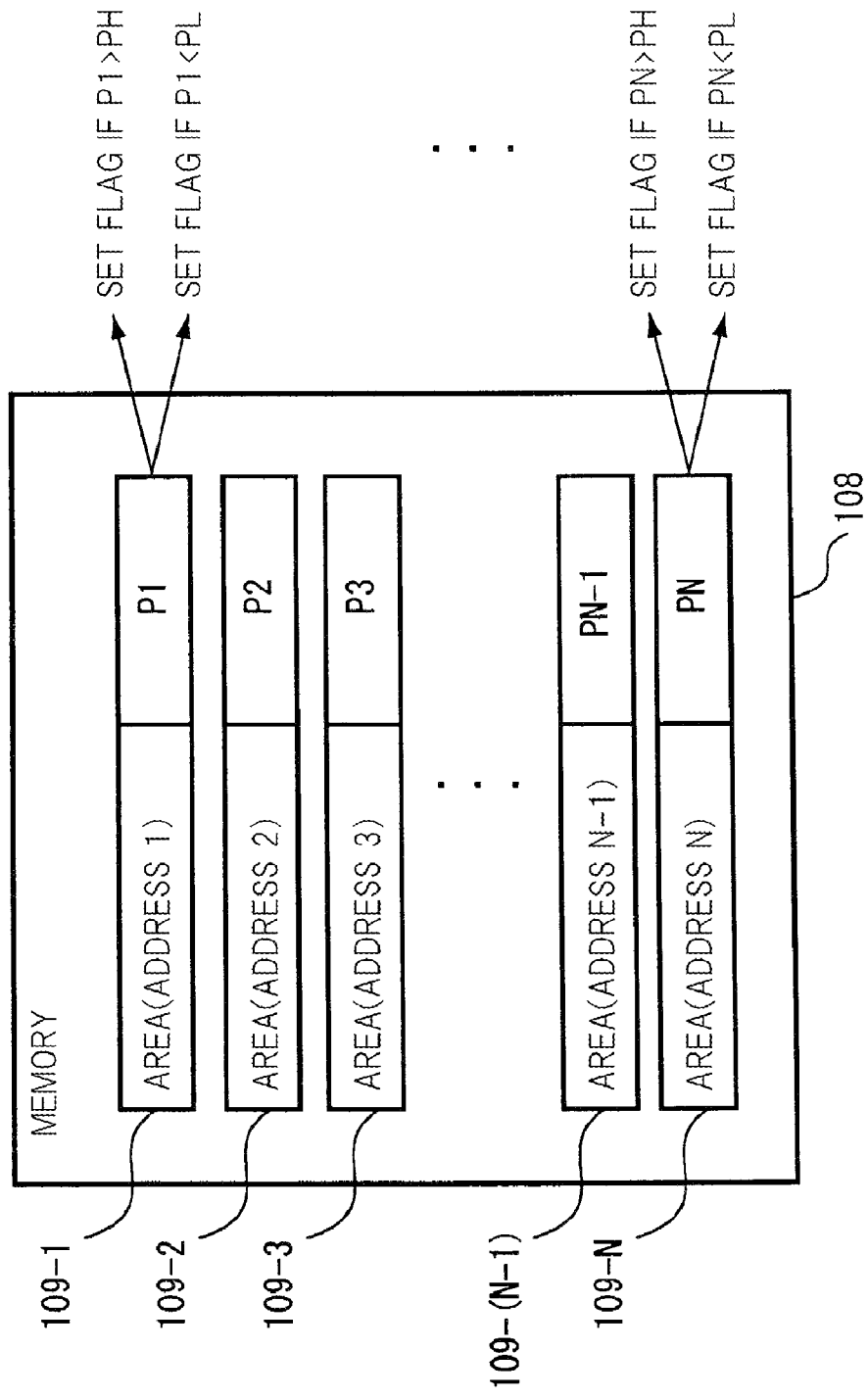
FIG. 9 is a modified example of FIG. 5 and is a block diagram for explaining control circuit 107 in FIG. 4.

FIG. 9 is a modified example of FIG. 5 and is a block diagram for explaining control circuit 107 in FIG. 4. As shown in FIG. 9, upper threshold PH and lower threshold PL are set in control circuit 107. When a digital monitor voltage amplitude of the burst cells stored in areas 109-1, 109-2, 109-3, . . . , 109-(N−1), and 109-N of memory 108 exceeds the threshold, a flag corresponding to the digital monitor voltage amplitude of the burst cell is set to a specified address.

For example, a flag is set to address 1 if P1>PH, a flag is set to address 1 if P1<PL, a flag is set to address N if PN>PH, and a flag is set to address N if PN<PL.

In this way, a light receiving power alarm function for all burst cells can be realized by setting the determination threshold of a light receiving power monitor value to determine the alarm for all burst cells as needed.

Second Exemplary Embodiment

FIG. 10 is a first modified example of FIG. 4 and is a block diagram of a schematic configuration of the optical module according to the present invention. As shown in FIG. 10, compared to FIG. 4, a cell specifying signal is inputted to control circuit 107 of optical module 100. In the example of FIG. 4, the digital monitor voltage amplitudes correspond to the repeatedly inputted burst cells. The cell specifying signal is a signal for recognizing the burst cells if the burst cells are random and for specifying to which addresses of areas 109-1, 109-2, 109-3, . . . , 109-(N−1), and 109-N the digital monitor voltage amplitudes will be stored.

Third Exemplary Embodiment

FIG. 11 is a second modified example of FIG. 4 and is a block diagram of a schematic configuration of the optical module according to the present invention. As shown in FIG. 11, compared to FIG. 4, the output of TIA 102 is connected to the input of current/voltage converter circuit 105 in optical module 100 without the use of current mirror circuit 104 to thereby input an output of current/voltage converter circuit 105 to ADC 106.

As a result, monitor voltage amplitudes P1, P2, P3, . . . , and PN can be stored in areas 109-1, 109-2, 109-3, . . . , 109-(N−

1), and 109-N of memory 108 in the same way even when current mirror circuit 104 is not used.

As described, according to the present invention, input signal light of burst cells is converted to digital monitor voltage amplitudes, the monitor voltage amplitudes are continuously stored in areas of the memory with addresses specified by an externally inputted control signal in accordance with the timing of the burst cells, and a monitor voltage is read out from an arbitrary area of the memory with the address specified by an external memory access signal.

Areas specified with addresses in a memory are provided to continuously import and store digital monitor voltage amplitudes of burst cells on a burst-cell-by-burst-cell basis by using only an external control signal. Furthermore, after the storage of monitor voltage amplitudes of continuous burst cells in the last area, the process returns to the storage of monitor voltage amplitudes in the first area to repeat the storage process and thereby always store, in each area, the latest value of the digital monitor voltage amplitude corresponding to each burst cell. As a result, optical power of an arbitrary burst cell can be immediately read out and extracted at arbitrary timing by a memory access signal, and the light receiving power of all burst cells can be monitored as needed.

Furthermore, a determination threshold of a light receiving power monitor value is set, and the alarms of all burst cells are determined as needed to thereby realize a light receiving power alarm function for all burst cells.

When the burst cells are random, the burst cells can be recognized, and the addresses of areas where the digital monitor voltage amplitudes will be stored can be specified.

When the current mirror circuit is not used, the output of TIA is connected to the input of the current/voltage converter circuit, and the output of the current/voltage converter circuit is inputted to ADC. As a result, the monitor voltage amplitudes can be stored in the areas of the memory, respectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A burst light receiving power monitor circuit that monitors a monitor voltage of a burst cell, the burst light receiving power monitor circuit comprising:
    a memory that includes a plurality of areas and that prepares an address for each area;
    a monitor voltage forming section that converts input signal light of the burst cell to a digital monitor voltage amplitude; and
    a controller that continuously stores the monitor voltage amplitude from the monitor voltage forming section in each area of the memory specified with an address by a control signal externally inputted according to the timing of the burst cell and that controls to read out a monitor voltage from an arbitrary area of the memory specified with an address by an external memory access signal.

2. The burst light receiving power monitor circuit according to claim 1, wherein the control circuit stores a threshold, and when the monitor voltage amplitude stored in each of the plurality of areas of the memory exceeds the threshold, sets a flag to the address of the area storing the monitor voltage amplitude to execute an alarm determination.

3. The burst light receiving power monitor circuit according to claim 1, wherein the control circuit recognizes a burst cell when the burst cell is random according to an externally inputted cell specifying signal, specifies the address of the area, and stores the monitor voltage amplitude.

4. The burst light receiving power monitor circuit according to claim 1, wherein the monitor voltage forming section outputs a digital monitor voltage to the control circuit with the input signal light of the burst cell being converted through a photodiode, a current mirror circuit, a current/voltage converter circuit, and an ADC.

5. The burst light receiving power monitor circuit according to claim 1, where into a path that forms a main output signal by allowing the input signal light of the burst cell to pass through a photodiode, a TIA circuit, and a LIM circuit, the monitor voltage forming section outputs a digital monitor voltage to the control circuit with a current from the TIA circuit is converted through the current/voltage converter circuit and the ADC.

6. A burst light receiving power monitor method for monitoring a monitor voltage of a burst cell, the burst light receiving power monitor method comprising:
    converting input signal light of the burst cell to a digital monitor voltage amplitude;
    continuously storing the monitor voltage amplitude in each area of the memory specified with an address by a control signal externally inputted according to the timing of the burst cell and repeating the storing by returning to process of storing of monitor voltage amplitude of the continuous burst cell in the first area after storing the monitor voltage amplitude in the last area; and
    controlling the reading out of a monitor voltage from an arbitrary area of the memory specified with an address by an external memory access signal.

7. A burst light receiving power monitor program for monitoring a monitor voltage of a burst cell, the burst light receiving power monitor program comprising:
    converting input signal light of the burst cell to a digital monitor voltage amplitude;
    continuously storing the monitor voltage amplitude in each area of the memory specified with an address by a control signal externally inputted according to the timing of the burst cell and repeating the storing by returning to the process of storing the monitor voltage amplitude of the continuous burst cell in the first area after storing the monitor voltage amplitude in the last area; and
    controlling the reading out of a monitor voltage from an arbitrary area of the memory specified with an address by an external memory access signal.

* * * * *